United States Patent Office
3,208,294
Patented Sept. 28, 1965

3,208,294
APPARATUS FOR FEEDING PHOTOGRAPHIC
FILM THROUGH A CAMERA AND FOR CUT-
TING AND STORING THE SAME
Zoltan Takats, Vestal, and Carl H. Jacobson, Binghamton,
N.Y., assignors to General Aniline & Film Corporation,
New York, N.Y., a corporation of Delaware
Original application Sept. 22, 1958, Ser. No. 762,514, now
Patent No. 3,018,709, dated Jan. 30, 1962. Divided
and this application Sept. 20, 1960, Ser. No. 57,217
1 Claim. (Cl. 74—112)

This application is a division of my copending application Serial No. 762,514, filed September 22, 1958, entitled "Apparatus for Feeding Photographic Film Through a Camera and for Cutting and Storing the Same," now Patent Number 3,018,709.

This invention relates to an apparatus primarily adapted for use with cameras whereby photographic film is fed through the camera where it is exposed, cut into sheets, and stored ready for developing. More particularly, this invention relates to a feeding, cutting, and storing mechanism which can be used in combination with an aerial camera which mechanism operates automatically without the aid of the pilot or other operator.

It is well known that an aircraft used for aerial photographic reconnaissance has to return to its home base in order to have the pictures, taken during a flight, developed. In highly mobile warfare, it is vital that no valuable time be lost and these pictures be made available for inspection and evaluation without undue delay. Also, in some instances pictures taken during a flight are not as good as desired and a retake becomes necessary and it is of utmost importance that this be known in the shortest possible time, preferably while the airplane is still in flight.

In accordance with the invention, the aerial photographic apparatus enables immediate development of the pictures taken by the camera while the plane is in flight so that they may be examined and evaluated by the pilot or any other person on board the plane. The time lag between the taking of the picture and the subsequent development thereof is compensated by the novel arrangement cutting the continuous strip of film into individual sections and storing the cut sections for processing apparatus.

It is an object of this invention to provide an apparatus in coaction with a camera which automatically feeds a continuous strip of film through the camera to be exposed therein, cuts the exposed film into sections and stores the cut sections until each is developed in the sequential order of the exposures.

It is a further object of this invention to provide a novel feeding means which can be combined with a camera for automatically feeding photographic film therethrough.

It is a still further object of this invention to provide a novel cutting and guiding means for guiding a continuous film into a storage hopper and cutting the film into sections of desired size to be stored in the hopper.

It is another object of this invention to provide a novel hopper and operating means therefor for storing cut film.

It is still another object of this invention to provide an apparatus for feeding, cutting and storing photographic film which is of compact construction and light in weight so it can be mounted in an airplane.

Other objects and features will be apparent from the following description of the invention, pointed out in particularity in the appended claim and taken in connection with the accompanying drawings, in which:

*Flim feeding mechanism*

Figure 1:
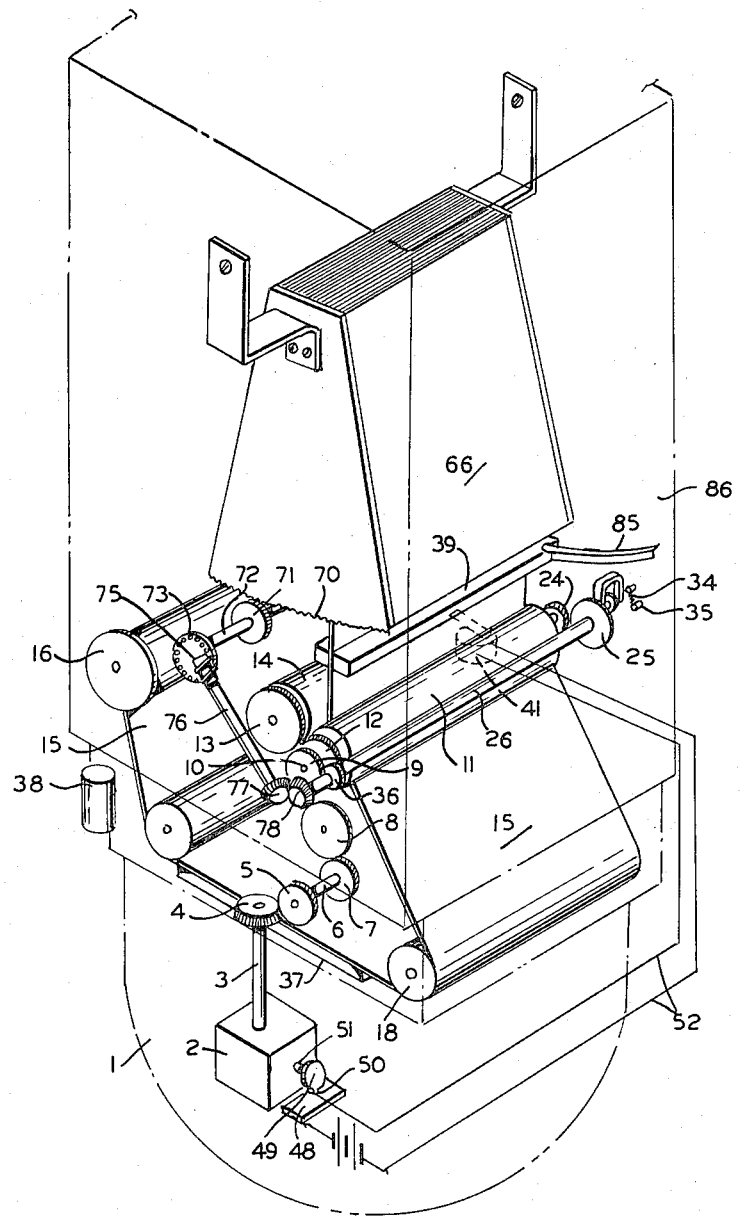
FIG. 1 is a perspective schematic view of the novel apparatus of this invention.

As shown in FIG. 1, the novel apparatus includes a camera 1 in which is housed an electric motor 2 for driving certain movable parts of the novel apparatus. The camera proper may be any suitable camera such as an aerial camera. The shaft 3 of the motor is provided with a bevel gear 4 meshing with a bevel gear 5 mounted on shaft 6 provided on the other end thereof with a gear 7 meshing with gear 8 which in turn meshes with gear 9 mounted on a shaft 10 whereby the shaft 10 is rotated by motor 2. Loosely mounted on shaft 10 is a roll 11. The roll 11 carries a gear 12 meshing with gear 13 mounted on roll 14. The rolls 11 and 14 are positioned adjacent each other and serve to intermittently move the film 15, which is stored on a roll 16, under idler roll 17 past the lens of the camera then under idler roll 18 to the cutting station and into the hopper.

Figure 5:
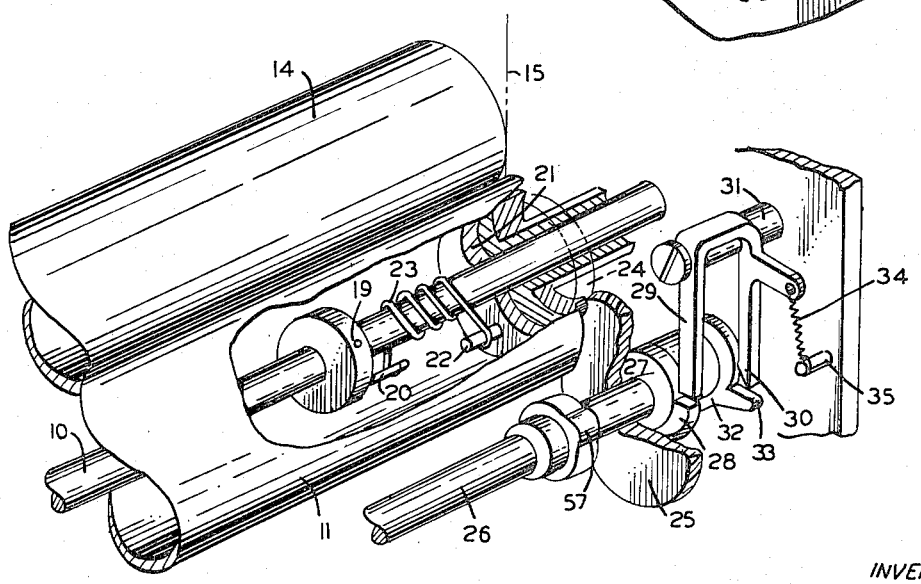
FIG. 5 is a detail view partly in section of one end of the feed rolls showing the means for causing intermittent rotation thereof.

In FIG. 5 is shown in detail the structure used for intermittently rotating roll 11. As shown in this figure, the shaft 10 has pinned thereto, adjacent its end opposite the end carrying gear 9, a collar 19 which has a pin 20 projecting therefrom. A bushing 21 is rigidly secured to roll 11. This bushing is provided with a pin 22 projecting therefrom toward pin 20 on the collar 19. The shaft 10 passes freely through this bushing. A spring 23 is loosely coiled about shaft 10 with one end of the spring secured to pin 20 and the other end secured to pin 22. The shaft 10 with collar 19 is continuously rotated by gear 9. This causes a tensioning of spring 23. When the tension of the spring reaches a predetermined point, it causes a rapid rotation of the roll 11 fixed to the bushing 21 and an overriding of the shaft 10 until the tension of the spring is relieved. Rotation of roll 11 causes a rotation of roll 14 through gears 12 and 13. The rotation of rolls 11 and 14 moves the film 15 as indicated above.

To bring the roll 11 to an abrupt stop after the tension on spring 23 has been relieved, a gear 24 is rigidly secured to roll 11 and bushing 20. The gear 24 meshes with a gear 25 loosely mounted on a continuously rotating shaft 26. Also loosely mounted on shaft 26 and rigidly connected to gear 25 is a cam 27 having a stop 28. This cam cooperates with a pawl 29 rigidly connected with a lever 30. Pawl 29 and lever 30 form a U-shaped element which is pivotally mounted on a pin 31 extending from the supporting frame of the apparatus. The lever 30 cooperates with a cam 32 provided with a high spot 33 and rigidly mounted on shaft 26. The pawl 29 and lever 30 are maintained in contact with their respective cams 27 and 32 by means of a spring 34, one end of which is secured to lever 30 and the other end of which is secured to a pin 35 extending from the frame of the machine. Upon continuous rotation of shaft 26 carrying cam 32 therewith, the high point 33 of this cam periodically swings the lever 30 outwardly on its pivot, which lever carries the pawl 29 away from cam 27, thereby releasing this cam 27 and gear 25 enabling this gear and cam to be rotated by gear 24 on roll 11. When the high point 33 of cam 32 moves away from lever 30, both the lever 30 and pawl 29 are moved back to the position shown in FIG. 5, by spring 34 whereby the pawl 29 stops the rotation of cam 27 by engagement with stop 28, thereby stopping the rotation of gears 25 and 24 and roll 11. The shaft 26 is rotated by means of gear 36 (FIG. 1) meshing with gear 9.

Vacuum means 37 (FIG. 1) are provided adjacent the edges of the portion of the film 15 opposite the lens to keep the film against the camera and to prevent the film from buckling. A vacuum tank 38 is connected to vacuum means 37.

Cutting and guiding mechanism

Figure 2:
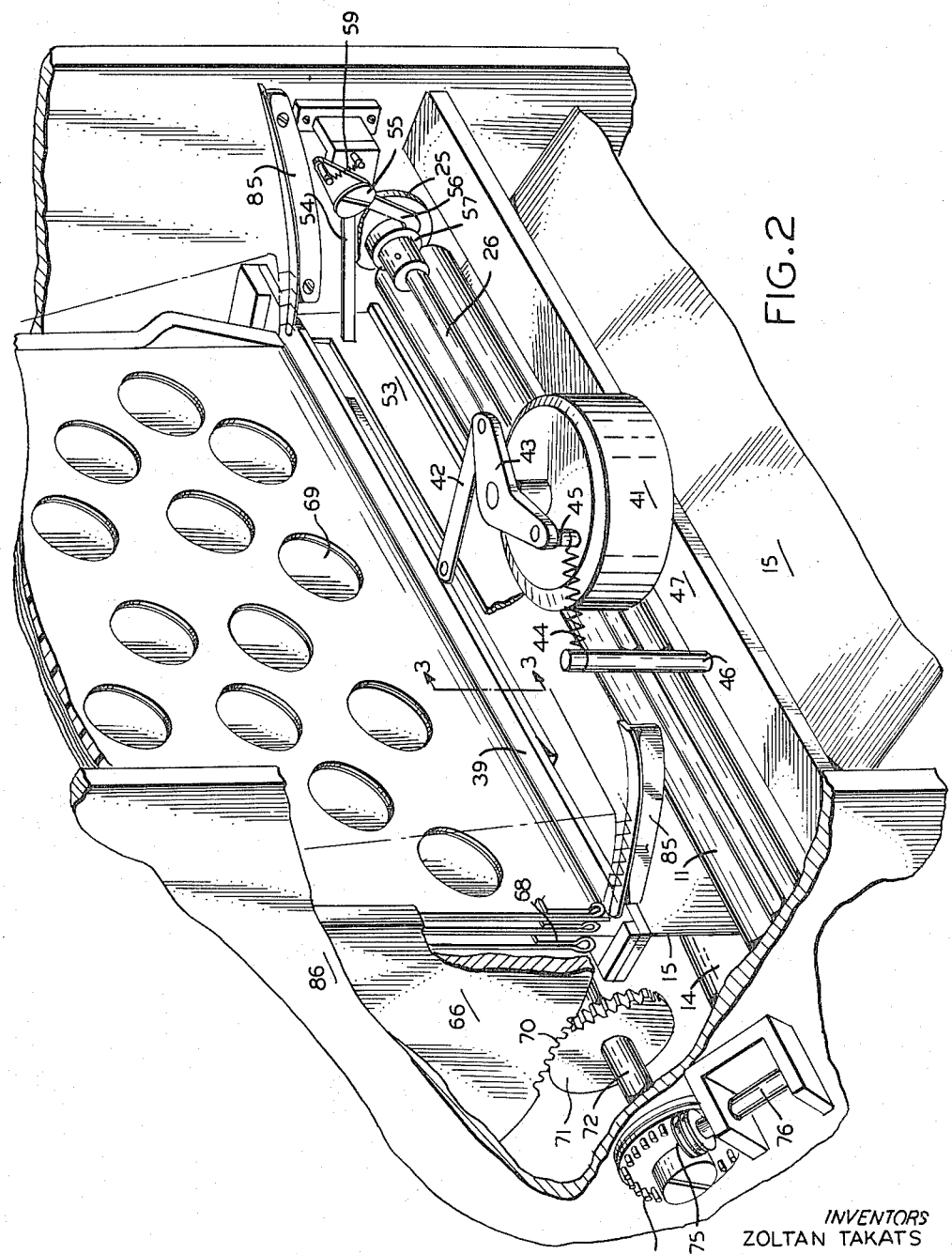
FIG. 2 is an enlarged perspective view partly in section illustrating the knife station and portions of the storage unit.
Figure 3:
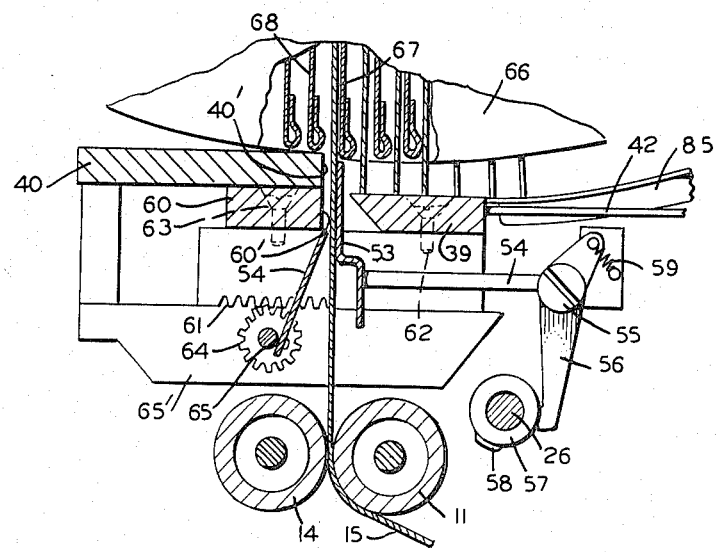
FIG. 3 is a sectional view taken along the line 3—3 FIG. 2 showing the knife in normal position.
Figure 4:
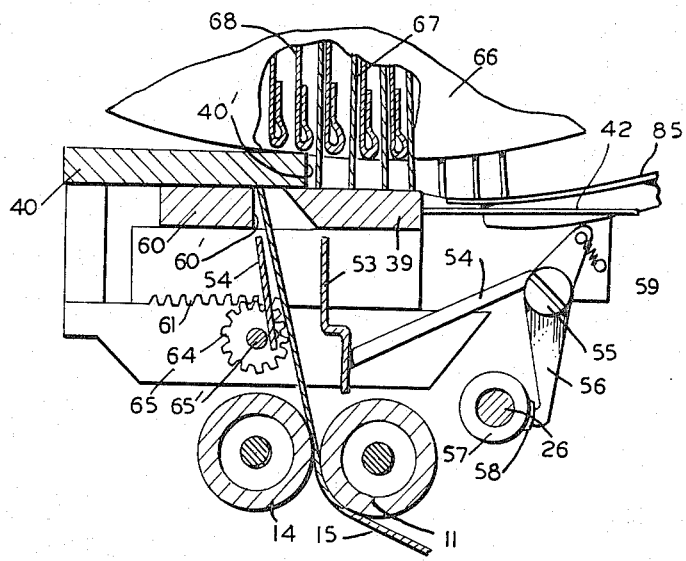
FIG. 4 is a sectional view similar to FIG. 3 but showing the knife in the cutting position.

The cutting and guiding mechanism for the film as shown in FIGS. 3 and 4 comprises a movable knife 39 and a stationary knife 40. The movable knife is moved to cutting position by means of a solenoid 41 (FIGS. 1 and 2) connected to knife 39 by means of arm 42 and lever 43 and is moved to inoperative position by means of spring 44 having one end attached to pin 45 on lever 43 and the other end attached to a pin 46 projecting from bracket 47 upon which the solenoid is mounted. The operation of the solenoid is controlled by a microswitch 48 operated by cam 49 having high point 50 on shaft 51 driven by motor 2. The switch 48 is electrically connected to solenoid 42 by leads 52.

As shown in FIGS. 3 and 4, guide elements 53 and 54 are provided for guiding the film into the hopper. Guide element 53 when in operative position lies in the path of movement of the knife 39 and before the knife can move to cutting position, this guide has to be moved downwardly. In order to accomplish this, the guide 53 is mounted on arm 54 which is attached to a pivoted stud 55. Rigidly attached to the stud 55 is a lever 56, one end of which rides on a cam 57 mounted on shaft 26. When the high point 58 of cam 57 contacts lever 56, it moves this lever to the right (FIG. 3) thereby rotating stud 55 counterclockwise and moving arm 54 and guide 53 downwardly to the position shown in FIG. 4. A spring 59 has one end attached to the other end of lever 56, the other end of the spring being attached to the frame of the machine to keep the first mentioned end of lever 56 in contact with the cam and to move the arm 54 and guide 53 from the position shown in FIG. 4 back to the position shown in FIG. 3.

A plate 60 extends in spaced parallel relation to knife 39 forming a passageway between the knife and plate through which passageway the film 15 passes as it enters the hopper. Both the knife and plate are attached to a rack plate 61 by screws 62 and 63, respectively. The rack plate meshes with a pinion 64 mounted on a shaft 65 journalled in side plates 65'. The guide 54 is rigidly attached to pinion 64 and moves therewith. As the knife 39 is moved to cutting position, the plate 60 and rack 61 move with it. Movement of rack 61 actuates pinion 64 to move guide 54 from the position shown in FIG. 3 to the position shown in FIG. 4. The plate 60 and guide 54 provide a support for the portion of the cut film below the knife to prevent the film from crimping. Upon return movement of the knife, the rack moves the pinion 64 and guide 54 back to the position shown in FIG. 3 thereby once more aligning the film with a pocket in the hopper. The guides 53 and 54, the edge 60' of plate 60 and the edge 40' of stationary knife 40 all cooperate to insure proper alignment of the film with a pocket in the hopper.

Hopper and operating mechanism therefor

The hopper 66 is mounted to oscillate above movable knife 39 and stationary knife 40. The hopper is subdivided into a plurality of pockets 67 by means of a plurality of partitions 68 as shown in FIGS. 2, 3 and 4. Each partition 68 is provided with cut-out portions 69 to minimize the area of contact between the film and partition, thereby minimizing friction between the film and partition and preventing formation of a vacuum between the film and partition.

Figure 6:
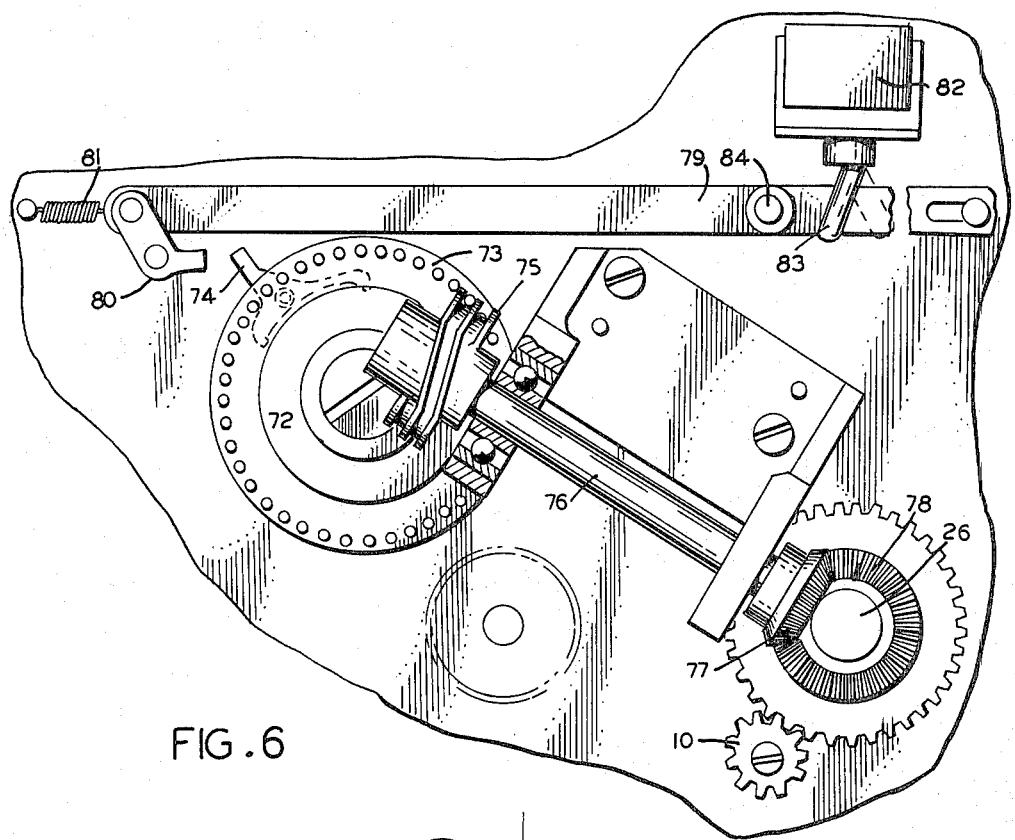
FIG. 6 is a detail view on a larger scale showing the elements used to move the hopper stepwise.

The lower ends of two opposite walls of the hopper 66 are arcuate in shape and are provided with teeth to form racks 70. One of these racks is shown in FIGS. 1 and 2 as meshing with spur gear 71 pinned on a shaft 72. One end of this shaft carries an intermittent gear 73 loosely mounted thereon, but which gear may be locked to the shaft by a pawl 74 forming a clutch. The intermittent gear 73 meshes with a worm gear 75 rigidly secured to one end of a shaft 76. The other end of this shaft has a bevel gear 77 pinned thereto. Bevel gear 77 meshes with bevel gear 78 mounted on one end of shaft 26 (FIGS. 1 and 6). Rotation of shaft 26 causes rotation of shaft 76 and worm gear 75 and the actuation of the intermittent gear 73 thereby causing an indexing of the hopper in one direction to bring each pocket successively into alignment with guides 53, 54 to permit the film 15 to enter the pocket.

When the hopper has been moved in one direction as described above to the limit of its movement in said direction, that is, when all of the pockets have been filled, it operates a cut-off switch (not shown) to cut off the current to motor 2 thereby stopping the machine. The hopper may be reset or moved to its original position manually. This can be accomplished by disconnecting intermittent gear 73 from its shaft 72. For this purpose, there is provided a slidable lever 79 having at one end a pawl 80 which is positioned when the lever is moved to the right as shown in FIG. 6, to contact the pawl 74 to disconnect the intermittent gear 73 from its shaft 72. A spring 81 having one end connected to lever 79 and the other end connected to the frame of the machine maintains lever 79 and pawl 80 in their normal inoperative positions.

A safety-switch 82 is positioned adjacent the lever 79 for cutting off the power to the apparatus to stop the operation thereof. The safety-switch is provided with a button 83 adapted to be contacted by a stud 84 attached to lever 79 when the latter is moved to the right (FIG. 6).

Operation

In operating the novel apparatus as described above, a roll of film 16 is placed in the camera on supports provided therefor in the position shown in FIG. 1. The film 15 of roll 16 is then threaded manually by passing it under idler roll 18, past the lens of the camera and under and partly around idler roll 17, thence between rollers 11 and 14, between guiding means 53 and 54 and into a pocket 67 of hopper 66. The apparatus is now ready for automatic operation.

When it is desired to operate the apparatus, the motor 2 is energized by throwing the usual switch (not shown). Energization of the motor causes rotation of shaft 3 which by the system of gearing already described causes intermittent rotation of the film advancing rolls 12 and 14 to intermittently pull the film 15 from roll 16 past the camera lens and advance it into the hopper. The various parts of the apparatus are so proportioned that the interval of time the rolls 12 and 14 remain stationary is of sufficient duration to permit the portion of the film opposite the lens to be exposed, the knife 39 to be actuated to cut the film and the hopper to be advanced a distance equal to the width of one pocket 67. The interval of time that rolls 12 and 14 are rotated to advance the film is sufficient to remove the exposed portion of the film from opposite the lens and bring a fresh portion of unexposed film opposite the lens to be exposed upon the next opening of the shutter of the cemera.

The knife 39 is actuated in timed relation to the actuation of the advancing rolls 11 and 14 by the microswitch 48 actuated by cam 49 driven by motor 2 which microswitch 48 controls the flow of electric current to the knife actuating solenoid 41. The movement of guide 53 and the indexing of the hopper 66 is timed with respect to the movement of the film and knife by means of shaft 26 which is rotated by motor 2, shaft 3 and the train of gearing already described. All movable parts of the apparatus are thus operated in timed relation with respect to each other automatically without the aid of an operator.

As shown in FIGS. 3 and 4, the portions of the cut film within the pockets 67 of the hopper are initially supported on the upper surface of knife 39. Stationary arcuate supports 85 are located below the two opposite walls of the hopper forming the racks 70 to support the cut portions of the film within the pockets 67 after the filled pockets are moved beyond the knife 40.

The hopper disclosed contains 52 pockets, though this number may be varied as desired.

The parts of our apparatus located outside the camera are enclosed within a light-proof casing 86 attached to the back of the camera and cooperating with the camera to prevent leakage of light to the film before and after it is exposed and moved into the hopper.

Our invention is not limited to the detailed description given above, but includes all modifications that fall within the scope of the appended claim.

We claim:

In an apparatus for imparting intermittent feed movement to web material, said apparatus comprising a pair of cylindrical means having surfaces engageable with opposite surfaces of said web material for feeding same; the improved drive means comprising a shaft for rotatably mounting one of said cylindrical means, a disc rigidly fixed on said shaft, a bushing rotatable on said shaft and adapted to be secured to said one of said cylindrical means, a spring coiled around said shaft and having its ends respectively secured to said disk and bushing, means for stopping rotation of said bushing comprising a second shaft geared near one of its ends to said first shaft, and geared at its other end to said bushing, said second shaft having a cam attached thereto, a lever having a pair of arms one of which is engageable by said cam, a gear loosely mounted on said second shaft, a stop abutment carried by said latter gear adapted to engage the other arm of said lever, a gear fixed on said bushing and meshing with the loosely mounted gear on said second shaft, and means for rotating said second shaft, whereby rotation of said second shaft determines the successive engagement and disengagement of said cam and stop abutment with said lever arms for intermittent stopping of the rotation of said cylindrical means.

References Cited by the Examiner

UNITED STATES PATENTS

| | | | |
|---|---|---|---|
| 1,891,101 | 12/32 | Le Count | 74—112 |
| 1,959,294 | 5/34 | Phillips | 83—449 |
| 2,023,235 | 12/35 | Le Count | 74—112 |
| 2,227,133 | 12/40 | Hall | 74—112 |
| 2,786,527 | 3/57 | Burns | 83—449 |

BROUGHTON G. DURHAM, *Primary Examiner.*

CARL TOMLIN, DON A. WAITE, *Examiners.*